United States Patent
Preyer

(10) Patent No.: US 6,199,274 B1
(45) Date of Patent: Mar. 13, 2001

(54) METHOD OF MAKING OIL SCRAPER PISTON RINGS

(75) Inventor: Karlfried Preyer, Wermelskirchen (DE)

(73) Assignee: Federal-Mogul Burscheid GmbH, Burscheid (DE)

(*) Notice: Subject to any disclaimer, the term of this patent is extended or adjusted under 35 U.S.C. 154(b) by 0 days.

(21) Appl. No.: 09/203,174

(22) Filed: Nov. 30, 1998

(30) Foreign Application Priority Data

Nov. 28, 1997 (DE) .............................................. 197 52 720

(51) Int. Cl.$^7$ ...................................................... B23P 15/06
(52) U.S. Cl. ................................ 29/888.074; 29/888.075; 29/527.6; 451/51; 427/367; 427/404; 427/331
(58) Field of Search ..................... 29/888.074, 888.075, 29/888.07, 527.6; 451/51, 49; 427/367, 433, 404, 331

(56) References Cited

U.S. PATENT DOCUMENTS

| | | | |
|---|---|---|---|
| Re. 33,767 | * 12/1991 | Christini et al. | ...................... 428/544 |
| 2,380,654 | * 7/1945 | Lane et al. | ...................... 29/888.075 |
| 2,696,038 | * 12/1954 | Hunt | ................................ 29/888.074 |
| 2,905,512 | * 9/1959 | Anderson | ........................ 29/888.074 |
| 3,671,047 | * 6/1972 | Umezawa | ........................ 29/888.074 |
| 3,729,790 | * 5/1973 | Sugahara | ........................ 29/888.075 |
| 4,057,661 | * 11/1977 | Züst | ..................................... 427/125 |
| 5,461,776 | * 10/1995 | Wood | ............................... 29/888.074 |
| 5,721,056 | * 2/1998 | Wessling | .............................. 428/461 |
| 5,743,012 | * 4/1998 | Adams et al. | .................. 29/888.074 |
| 5,779,818 | * 7/1998 | Wessling | .............................. 148/240 |

FOREIGN PATENT DOCUMENTS

| | | |
|---|---|---|
| 2 050 441 | 8/1972 | (DE) . |
| 17 51 573 | 1/1978 | (DE) . |
| 196 21 721 | 12/1996 | (DE) . |
| 0 217 126 | 4/1987 | (EP) . |
| 0 507 636 | 10/1992 | (EP) . |

* cited by examiner

Primary Examiner—David P. Bryant
Assistant Examiner—Marc W. Butler
(74) Attorney, Agent, or Firm—Venable; Gabor J. Kelemen

(57) ABSTRACT

A method of making an oil scraper piston ring includes the following steps of providing a base ring body including a circumferential web having flanks and an outer circumferential surface; galvanically depositing on the web a wear resistant hard chromium layer having solid particles embedded therein; applying a break-off resistant cover layer to the hard chromium layer; and grinding the cover layer to provide the outer circumferential surface of the web with sharp bounding edges

11 Claims, 1 Drawing Sheet

METHOD OF MAKING OIL SCRAPER PISTON RINGS

CROSS REFERENCE TO RELATED APPLICATION

This application claims the priority of German Application No. 197 52 720.5 filed Nov. 28, 1997, which is incorporated herein by reference.

BACKGROUND OF THE INVENTION

This invention relates to a method of making oil scraper (oil control) piston rings which have at least one circumferential web portion whose outer circumferential surface lies against and slides along the cylinder wall. To the outer circumferential web surface a wear-resistant layer is applied and is subsequently ground to form sharp edges on the web.

Oil scraper piston rings in a reciprocating piston-type machine serve for distributing an oil film over the cylinder wall. The oil film is just sufficient for lubricating the slide path of the upper piston rings (compression piston rings), and the oil scraper rings deliver the remainder of the oil back into the crankcase. It is an essential requirement that an oil scraper piston ring maintain, independently from the shape of the cylinder, a circumferentially constant surface pressure between the cylinder wall and the runner face of the ring.

Oil scraper piston rings which have an axially narrow circumferential web engaging the cylinder wall are exposed to high surface pressures during operation. For this reason the runner faces of such rings are conventionally provided with a wear-resistant layer, as disclosed, for example, in published European Patent Application 507 636. The piston ring has axially extremely narrow webs so that the surface pressure on the piston ring is very high. Since the wear-resistant layer conventionally constituted by a chromized outer layer of the web does not have the properties required for use in more current engine designs, a hardening of the webs has been effected by nitriding.

Dependent, for example, upon engine type, mode of operation and kind of oil, the oil scraper piston rings may have a service life of 400,000 km in automotive vehicles. Based on the desideratum, particularly in diesel engines, to reach a service life of 1,000,000 km and beyond, wear-resistant layers for compression piston rings have been developed as disclosed, for example, in published European Application 217 126. The wear-resistant layer has, throughout the entire layer volume, firmly embedded ceramic particles which lend the layer an extremely high load bearing capacity and wear resistance. Applying such a layer to conventional oil scraper piston rings has heretofore not been possible because the oil scraper piston rings, after applying a wear-resistant layer to the circumferential web surface, have to be ground in order to obtain a sharp edge which is indispensable for a good oil scraping operation. Since the grinding of the layer has led to the break-off of the ceramic particles, such a layer, although-known by itself, could heretofore not be used for oil scraping piston rings.

SUMMARY OF THE INVENTION

It is an object of the invention to provide an improved method for applying a wear-resistant layer, known by itself, to oil scraper piston rings to thus extend their service life.

This object and others to become apparent as the specification progresses, are accomplished by the invention, according to which, briefly stated, the method of making an oil scraper piston ring includes the following steps:

providing a base ring body including a circumferential web having flanks and an outer circumferential surface;

galvanically depositing on the web a wear resistant hard chromium layer having solid particles embedded therein;

applying a break-off resistant cover layer to the hard chromium layer; and grinding the cover layer to provide the outer circumferential surface of the web with sharp bounding edges.

The method according to the invention prevents a break-off of the solid particles during the grinding process. Dependent upon the particular use, various materials may be utilized for the cover layer. If, for example, a galvanized hard chromium layer without ceramic particles is used as the cover layer, such cover layer need not be entirely removed by the grinding operation. The residual hard chromium cover layer remaining on the oil scraper piston ring then works as a wear-resistant layer. If, after a certain service life, the hard chromium cover layer is worn off, the underlying second, improved hard chromium layer having the embedded solid particles becomes active. Such a manufacturing method further increases the service life of the oil scraper piston ring.

DESCRIPTION OF THE PREFERRED EMBODIMENT

Figure 1:
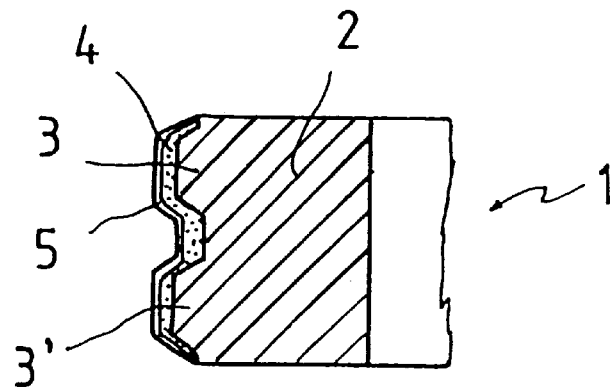
FIG. 1 is a fragmentary axial sectional view of a piston ring subsequent to coating steps forming part of the method according to the invention.

The oil scraper piston ring illustrated in FIG. 1 has an annular, preferably cast-iron base body 2. On its outer circumferential surface two axially spaced circumferential webs 3, 3' are arranged.

To the outer circumferential surface of the base body 2, including the webs 3, 3' and the spacing therebetween, a conventional galvanic hard chromium layer 4 is applied which includes solid (for example, ceramic) particles embedded therein. To the hard chromium layer 4 a break-off resistant cover layer 5 in applied by galvanization. The cover layer 5 may be a metal (without solid particles), such as copper, zinc, nickel, chromium or the alloys thereof. The thickness of the hard chromium layer 4 is preferably between 0.01 and 1.0 mm whereas the thickness of the cover layer 5 is, prior to the grinding operation, at least 0.01 mm.

Figure 2:
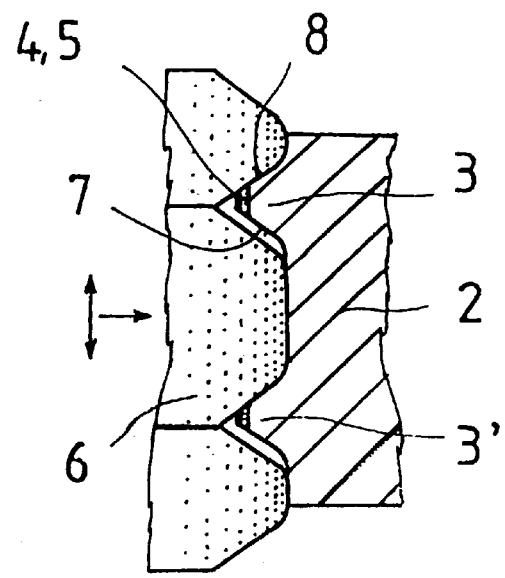
FIG. 2 is a fragmentary axial sectional view of the oil scraper piston ring during a grinding step forming part of the method according to the invention.

Turning to FIG. 2, after applying the hard chromium layer 4 and the cover layer 5, the outer circumferential surface of the ring is ground by a profiled grinding disk 6 to obtain sharp edges 5' that bound the outer circumferential layer surface. The webs 3, 3' are ground on their circumferential surface and/or at their flanks 7 and 8. On the circumferential web surface solely the cover layer in ground such that it is either partially or entirely removed. From the flanks 7 and 8 preferably both layers 4 and 5 are removed by the grinding operation.

In the example shown in FIG. 2 the grinding disk 6 is shaped in such a manner that while both layers 4 and 5 are removed from the flanks 7, 8 of webs 3, 3', from the outer circumferential surfaces of the webs 3, 3' no material removal takes place. It is, however, feasible, to remove the cover layer 5 partially or entirely from the outer circumferential surfaces. The hard chromium layer 4 applied to areas between the webs 3, 3' may be removed as well. To provide the sharp edges 5' it is feasible to grind only the cover layer 5 (removing it partially or entirely) only on the flanks 7 and 8 or to grind only the cover layer 5 (removing it partially or entirely) only from the outer (top) circumferential surface of the webs. A combined grinding on the flanks and the outer (top) circumferential surface of the webs is also feasible.

Figure 3:
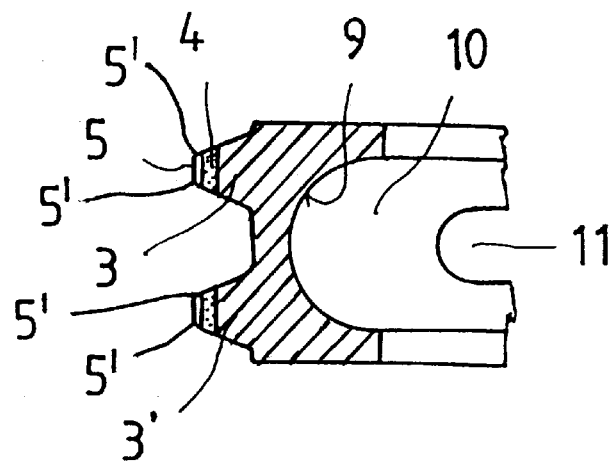
FIG. 3 is a fragmentary axial sectional view of a completed oil scraper piston ring made with the process according to the invention.

FIG. 3 illustrates a completed oil scraper piston ring made with a process according to the invention. On the inner circumferential surface 9 a recess 10 is machined for receiving a spring. Further, the oil scraper piston ring has a plurality of oil exit openings 11 distributed over its circumference.

It will be understood that the above description of the present invention is susceptible to various modifications, changes and adaptations, and the same are intended to be comprehended within the meaning and range of equivalents of the appended claims.

What is claimed is:

1. A method of making an oil scraper piston ring comprising the following steps:
   (a) providing a base ring body including a circumferential web having flanks and an outer circumferential surface;
   (b) galvanically depositing on said web a wear resistant hard chromium layer having solid particles embedded therein;
   (c) applying a break-off resistant cover layer to said hard chromium layer; and
   (d) grinding said cover layer to provide said outer circumferential surface with sharp bounding edges.

2. The method as defined in claim 1, wherein step (d) comprises the step of partially removing said cover layer from said outer circumferential surface.

3. The method as defined in claim 1, wherein step (d) comprises the step of fully removing from said outer circumferential surface solely said cover layer.

4. The method as defined in claim 1, wherein step (d) comprises the step of grinding said cover layer at said flanks.

5. The method as defined in claim 4, wherein step (d) comprises the step of grinding said cover layer solely at said flanks, whereby said, cover layer on said outer circumferential surface is left unground.

6. The method as defined in claim 5, wherein step (d) comprises the step of grinding off said cover layer and said hard chromium layer entirely from said flanks.

7. The method as defined in claim 1, wherein said cover layer is free from solid particles.

8. The method as defined in claim 1, wherein step (c) comprises the step of galvanically depositing said cover layer on said hard chromium layer.

9. The method as defined in claim 3, further comprising the step of selecting a material for said cover layer from the group consisting of copper, zinc, nickel, chromium and alloys thereof.

10. The method as defined in claim 1, wherein said hard chromium layer has a thickness of between 0.01 and 1.0 mm.

11. The method as defined in claim 1, wherein said cover layer has a thickness of at least 0.01 mm.

* * * * *